US007477233B2

(12) United States Patent
Duncan et al.

(10) Patent No.: US 7,477,233 B2
(45) Date of Patent: Jan. 13, 2009

(54) METHOD AND SYSTEM FOR PROVIDING MODIFIER KEY BEHAVIOR THROUGH PEN GESTURES

(75) Inventors: Richard J. Duncan, Kirkland, WA (US);
Emily K. Rimas-Ribikauskas, Seattle, WA (US); Robert J. Jarrett, Snohomish, WA (US); Leroy B. Keely, Portola Valley, CA (US); Ernest L. Pennington, II, Issaquah, WA (US); Shawna J. Davis, Seattle, WA (US); Sriram Viji, Seattle, WA (US); Thomas P. Russo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

(21) Appl. No.: 11/082,628

(22) Filed: Mar. 16, 2005

(65) Prior Publication Data

US 2006/0209014 A1    Sep. 21, 2006

(51) Int. Cl.
*G09G 5/00* (2006.01)
*G06F 3/033* (2006.01)

(52) U.S. Cl. .................. 345/156; 345/157; 345/163; 345/168; 345/173; 345/179; 178/18.01; 178/18.03; 178/19.01; 715/856; 715/863

(58) Field of Classification Search ............... 345/156, 345/157, 161, 163, 168, 172, 173, 179; 715/856–864
See application file for complete search history.

(56) References Cited

U.S. PATENT DOCUMENTS

| 5,543,591 | A | * | 8/1996 | Gillespie et al. | ......... 178/18.03 |
| 5,796,406 | A | * | 8/1998 | Shigematsu et al. | ......... 715/863 |
| 6,094,197 | A | * | 7/2000 | Buxton et al. | ................ 715/863 |
| 6,292,181 | B1 | * | 9/2001 | Banerjee et al. | ............. 345/179 |
| 6,924,790 | B1 | * | 8/2005 | Bi | .............................. 345/179 |
| 2006/0242607 | A1 | * | 10/2006 | Hudson | ...................... 715/863 |

* cited by examiner

Primary Examiner—Henry N Tran
(74) Attorney, Agent, or Firm—Workman Nydegger

(57) ABSTRACT

Described is a system and method in which pen gestures cause a mode to be entered in which a computing device acts as if a modifier key (e.g., Control, Alt, or Shift) was being pressed. This is accomplished by a pen driver sending a modifier key down to the keyboard and mouse input subsystem. Modifier key behavior is thus provided, including at times when a keyboard is not readily available. While in the modifier key mode, additional gestures can be input, including a gesture that results in the computing device acting as if multiple modifier keys are pressed. Also, while in the mode, visual feedback may be provided to indicate the mode is active. The mode may be exited by sending a corresponding modifier key up, and the exit may be triggered in various ways, including by other gestures, mouse or pen events, and certain keyboard input.

19 Claims, 7 Drawing Sheets

METHOD AND SYSTEM FOR PROVIDING MODIFIER KEY BEHAVIOR THROUGH PEN GESTURES

FIELD OF THE INVENTION

The present invention relates generally to computing devices, and more particularly to user interaction with computing devices.

BACKGROUND OF THE INVENTION

Contemporary computing devices allow users to input information in a number of ways, including via a keyboard, by one or more types of pointing devices, and buttons (typically on portable devices). With respect to pointing devices, a computer system may receive user input from a mouse and/or a touchpad, and if configured with a digitizer, by sensing touch, e.g., entered via a stylus (pen) or a finger.

Some personal computers, such as tablet-based personal computers, have the digitizer built into the display screen. This is highly beneficial for many users, as such a computing device can be operated with or without a keyboard. At the same time, operating without a keyboard presents many users with a number of problems.

One type of user, referred to as a power user, presses keyboard modifier keys (Shift, Control, Alt, AltGr, Windows®) in conjunction with graphical user interface interaction to perform enhanced user interface operations. For example, holding down the control key while using the mouse to drag an item may result in a different action being taken by the operating system or an application program. For example, holding the control key while dragging an item makes a copy of the dragged item; holding the Alt key creates a shortcut for that item. Modifier keys thus vary the drag action (move here, copy, create shortcut, and so forth), and similarly change the behavior of other mouse-related actions such as a click.

However, modifier keys are not readily available to power users when using a pointing device and operating without a keyboard. Although at times a soft (onscreen) keyboard panel can be popped up to make a keyboard available, operating in this way is not always convenient for users. What is needed is another way to provide modifier key behavior, and/or change other computer operating modes, including at times when a keyboard is not readily available.

SUMMARY OF THE INVENTION

Briefly, the present invention provides a system and method in which gestures (e.g., by pen, finger or mouse) cause a mode to be entered in which a computing device acts as if a modifier key was being pressed. While in the modifier key mode, additional gestures can be input, including a gesture that results in the computing device acting as if multiple modifier keys are pressed. Also, while in the mode, visual feedback may be provided to indicate the mode is active. The mode may be exited in various ways.

In one implementation, a digitizer driver detects gestures, and for certain gestures that a user has trained the system to recognize, enters the computing device into a modified mode. Suitable gestures include flicks, each comprising a short, quick and straight movement of a pointing device, and spikes, each comprising a pointer movement in one direction and back. For a gesture that corresponds to a modifier key, the pen driver sends a corresponding key down to an input subsystem, whereby the computing device enters a mode in which it acts as if the modifier key of a physical keyboard was being held down. For example, if the gesture corresponded to a Shift modifier key, the next mouse click will be treated as a Shift-click.

To add modifier keys to simulate a key combination operating mode, the pen driver allows a different gesture that represents a different modifier key to be input, and then sends a key down for that modifier to the input subsystem. The pen driver knows the state of other input by monitoring keyboard and mouse data via operating system-supplied low-level hooks.

Visible feedback may be provided to the user when in a modifier-key mode. The pen driver may draw a layered window proximate the mouse pointer, and write information in that window indicative of the modifier-key mode, e.g., text identifying each modifier key considered to be held down. In one implementation, the mode indicator window moves with the mouse pointer.

The pen driver also handles exiting the modifier key mode at an appropriate time based on further user action. Exiting is may be accomplished by sending a modifier key up to the input subsystem. Typical ways an end-user may exit the mode include detecting a pen tap/mouse up, pressing and releasing the Escape key, actuating a hardware button of the device, repeating the gesture that was used to enter the mode, and so forth.

Thus, the gesture handling process allows a user to enter a "sticky-key" mode for any gesture designated as a modifier key. Once in such a mode, the system monitors other gestures and system-wide mouse and keyboard input, so as to remain in the modifier key down state until an exit-related action is detected. Gestures can also enter the computing device into sticky-type modes that are not necessarily keyboard-related modes, such as a write-anywhere-text-recognition mode, or a landscape portrait mode switch.

Other advantages will become apparent from the following detailed description when taken in conjunction with the drawings, in which:

DETAILED DESCRIPTION

Exemplary Operating Environment

Figure 1:
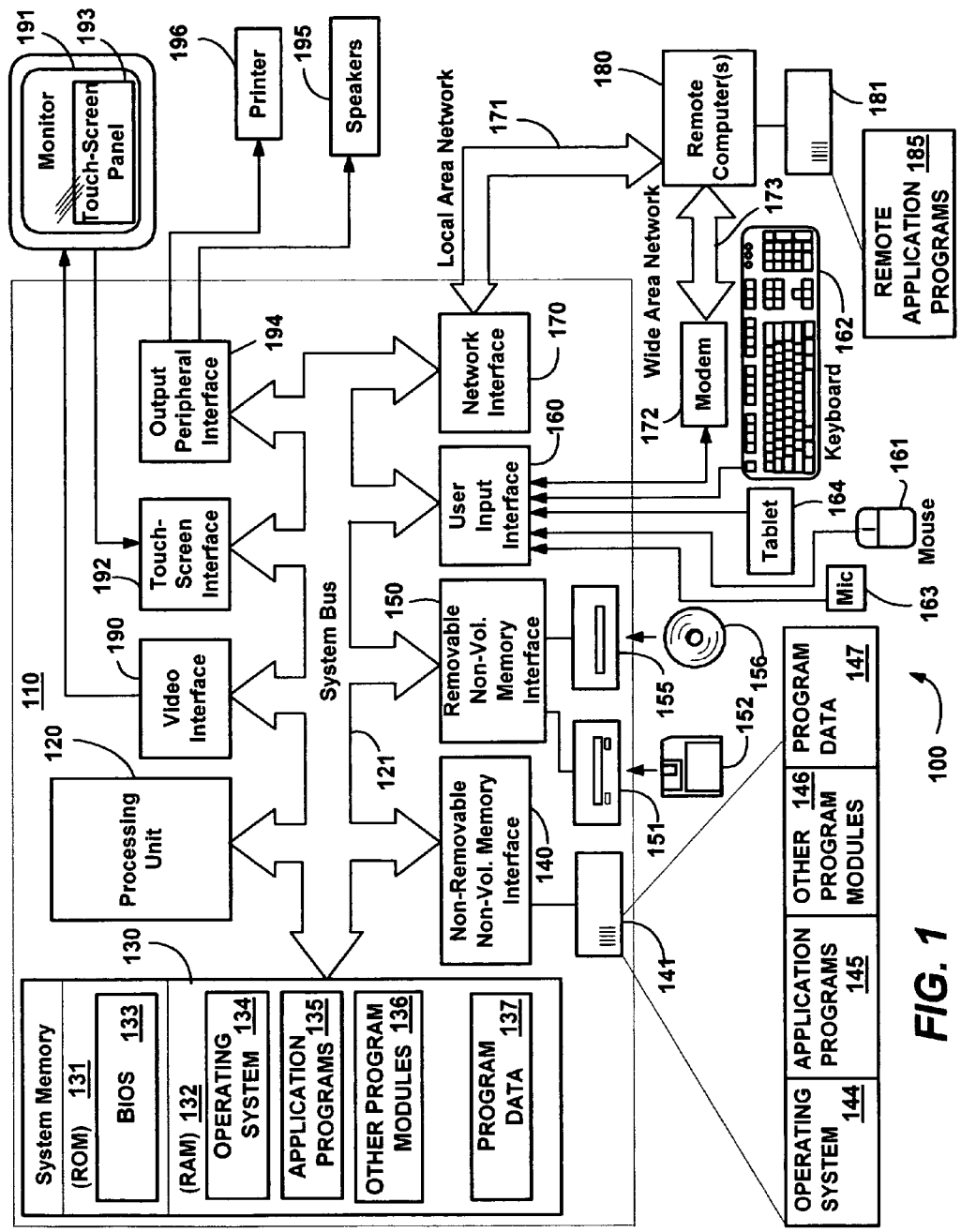
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Using Pen Gestures for Modifier Keys

The present invention is primarily directed to user input data entered via a pointing device, especially a stylus or pen, wherein in general the data corresponds to a set of coordinates (e.g., X, Y), and some additional state information. Certain data that is input is recognized as a gesture, wherein a gesture is a particular pointing device movement or other operation that invokes an action. Notwithstanding, it will be appreciated that aspects of the present invention are applicable to virtually any type of user data that can be input, such as keyboard entered data and speech data. Thus, although for purposes of simplicity the present invention will be described with reference to pointing device input including gestures, the present invention should not be limited in any way to any particular type of input device and/or by the gesture examples used herein.

As will be understood, numerous ways to implement the present invention are feasible, and only some of the alternatives are described herein. For example, in one implementation, the user may be considered as entering input via a pen-tip (cursor) that writes on a tablet-like device, such as the touch-screen panel 193. Note that this may not be literally correct for all devices and/or in all instances. For example, some devices such as a mouse or a pen capture device do not have a real, physical tablet and/or pen-tip. For such devices, a virtual tablet may be assumed. In other instances, electronic ink and other input-like information may be generated by an application program or other software, in which event the tablet and pen-tip may both be considered to be virtual. As such, the present invention is not limited to any particular examples used herein, but rather may be used various ways that provide benefits and advantages in computing in general.

Figure 2:
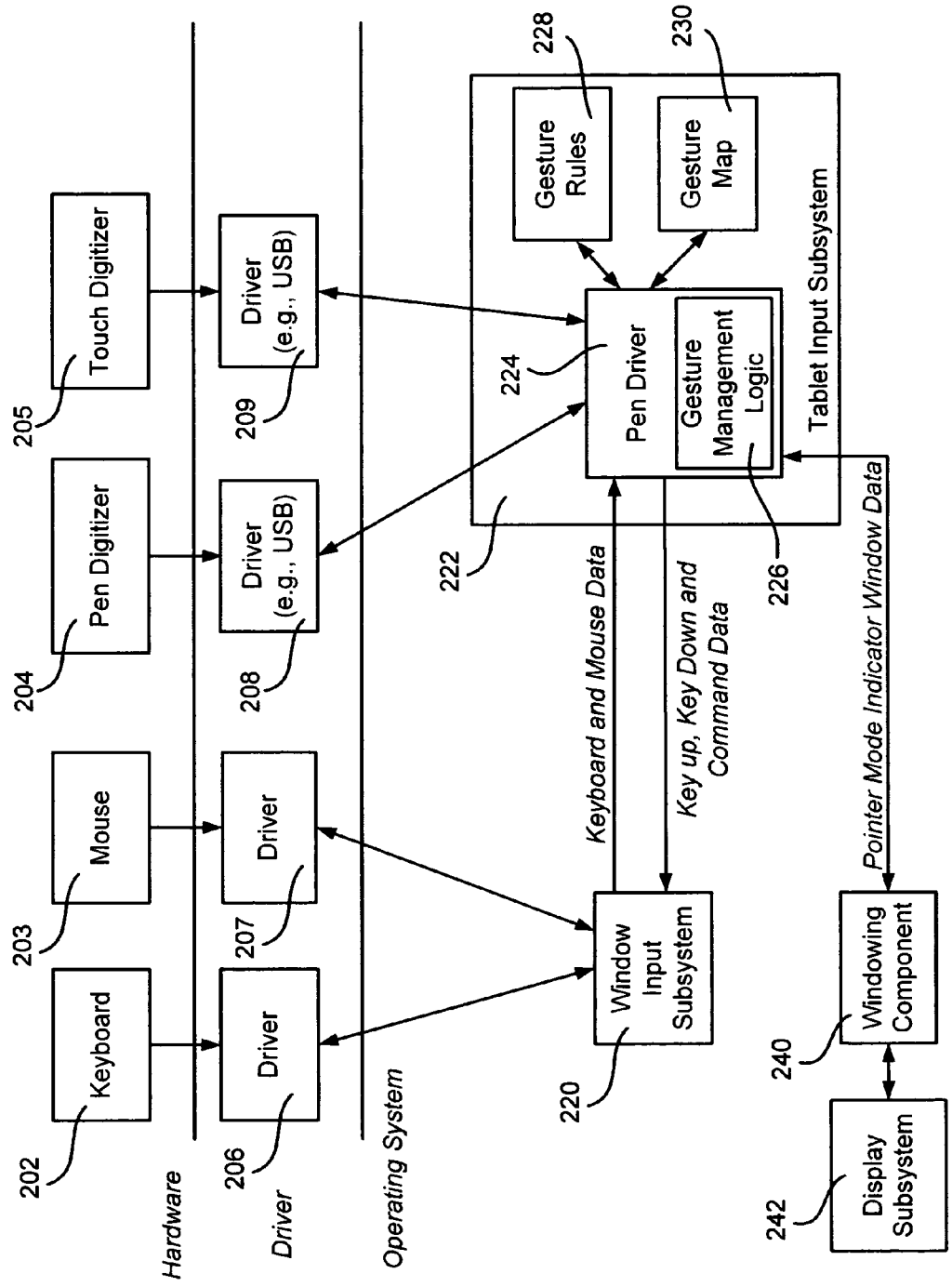
FIG. 2 is a block diagram generally representing components for controlling modes based on gestures, in accordance with various aspects of the present invention.

As generally represented in FIG. 2, various hardware input (human interface) devices are shown that provide user input data, such as a keyboard 202, a mouse 203, a pen digitizer 204 and a touch digitizer 205. Each of these devices 202-205 connects through a suitable driver (e.g., 206-209) to an operating system level component. Note that for purposes of example, each input device is shown as having its own driver, however one driver may handle the input of more than one device. In FIG. 2, the keyboard and mouse generated data are shown as being received at one operating system-level subsystem, referred to as a window input subsystem 220, while pen and touch generated data are shown as being received at another operating system-level subsystem, referred to as a tablet input subsystem 222. However, other architectures are feasible.

In general, a pen driver 224 of the tablet input subsystem 222 receives the pen and touch generated data, and also receives any keyboard and mouse data received at the window input subsystem 220. To monitor the keyboard and mouse data, the pen driver 224 employs low-level hooks, which in a Windows®-based operating system may be accomplished via well-known application programming interface calls. Other types of input, not represented in FIG. 2, may be similarly monitored.

In accordance with various aspects of the present invention, the pen driver 224 detects the various user input, and via gesture management logic 226, performs actions such as changing operating modes and issuing commands based on the various user input. More particularly, and as described below, the pen driver 224 detects gestures, and based on which gesture is detected, can enter one or more modes corresponding to a keyboard modifier key (Control, Shift, Alt, and AltGr, or modifier key combination) being pressed, as well as issue one-time commands, such as to simulate a right-mouse click or a Windows® keyboard key (present on many contemporary keyboards) being pressed. In this manner, a user is able to receive a significant amount of keyboard functionality, independent of whether a mouse and/or physical or soft (onscreen, pop-up) keyboard is readily available. Thus, a user such as a power user can have significant keyboard-like and/or mouse-like functionality via a pen or finger, including when no keyboard and/or mouse are connected, or when a keyboard and/or mouse is present but less convenient to the user than direct input.

Figure 3:
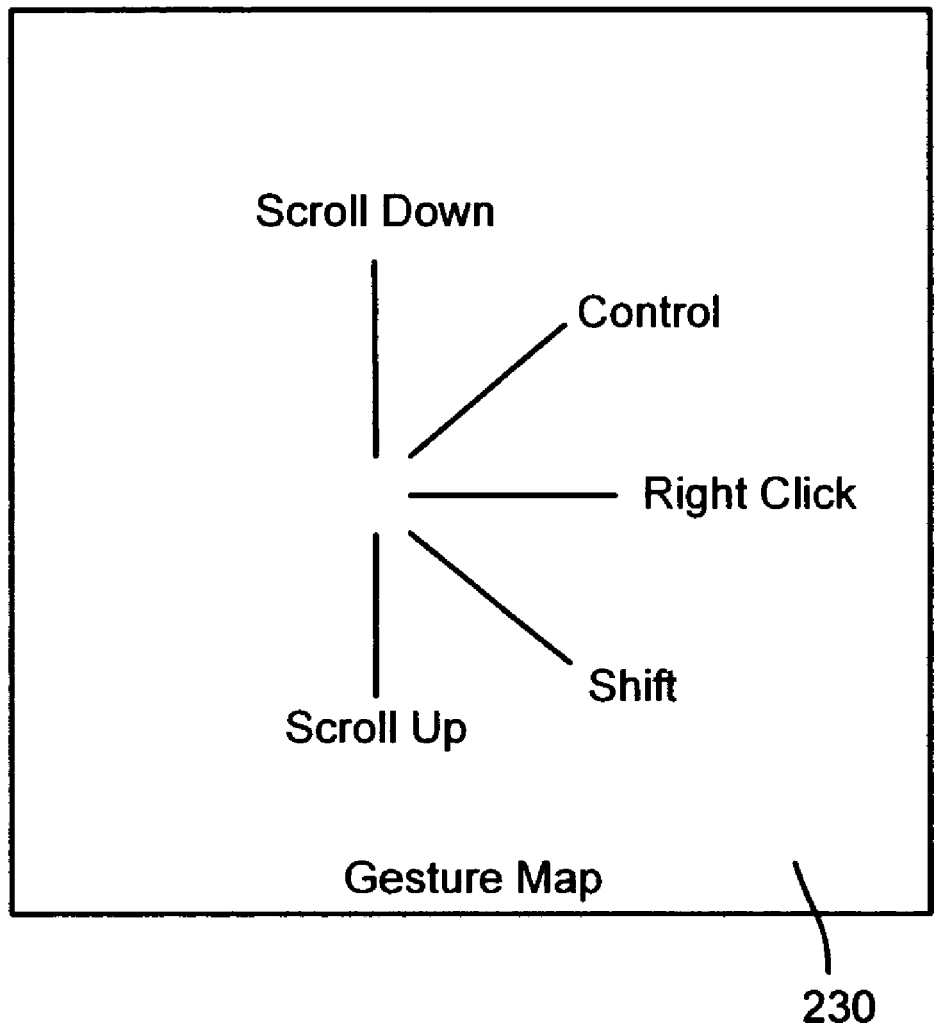
FIG. 3 is a representation of a map of gestures to actions, including actions for controlling modes based on gestures, in accordance with various aspects of the present invention.

In general, there are a number of gestures that the pen driver 224 can detect and differentiate between. To this end, the pen driver 224 employs various gesture rules 228 such as the direction, length of time, position and/or other criteria to determine whether the user input was intended to be a gesture or something else, e.g., a character stroke. As part of the detection, a gesture map 230, which may have been obtained via user training and/or have default settings, associates the gesture with an intended action. For example, as represented in FIG. 3, some possible actions are shown as corresponding to various direction-based gestures (e.g., represented as visible rather than coordinate-based data). In this example, for this user, an upward gesture generates a Scroll Down command, an upward and rightward gesture a Control key press, a rightward gesture generates a mouse right-click command, and so on.

Note that ideally, the user's intent with respect to entering a gesture versus another type of data would be properly detected every time, regardless of whether the user was writing on an inking surface when entering characters for recognition or entering free-form ink, or whether the user was inputting data on a mousing surface. Thus, the set of gestures should be such that confusion is lessened, e.g., a "slash"

character should not correspond too closely with a gesture. Note that to avoid conflicts, it is feasible to provide a gesture surface, or require the user to actuate a button (e.g., the pen barrel button) or other mechanism on the pen whenever entering a gesture. However, such alternatives are not necessarily desirable as other solutions, because, for example, having the user move to a special gesturing surface somewhat defeats the convenience of gestures, and not every user has a pen with a barrel button available.

Thus, one advantageous type of gesture is referred to as a flick, comprising a short, quick and straight movement of a pointing device of a computer system, as described in U.S. patent application Ser. No. 10/938,882, assigned to the assignee of the present invention and hereby incorporated by reference. One significant benefit to using flicks for gestures is that flicks are more easily distinguished from other user input, such as handwritten characters, and thus the user intent with respect to inputting a gesture is more accurately determined when flicks are used.

Another advantageous type of gesture is referred to as a spike. In general, a spike is created by moving the pointer in one direction, and, without interruption, (e.g., without lifting the pen or finger), moving the pointer substantially in the opposite direction. A benefit to spikes is that (somewhat like flicks) users do not tend to input data this way for other purposes, and thus spike detection is a highly accurate way to distinguish gestures from other input, including character input and even general free-form inking (e.g., drawing or note taking) input.

Returning to FIG. 2, when the gesture rules 228 and gesture map 230 detect a gesture and its corresponding action to take, the pen driver 224 includes gesture management logic 226 (described below with reference to FIGS. 7 and 8) that results in a simulated keyboard key press and/or release, or a command (e.g., a right-click) being sent by the pen driver 224 to the window input subsystem 220. In this manner, the pen driver 224 is able to send modifier key up or key down data to the window input subsystem 220 and thereby change an operating mode with respect to further input. Similarly, instead of changing a modifier key mode by entering (key down) or exiting (key up) a mode, via a gesture, any mapped command can be issued, such as a mouse Right-click down and release, or a Scroll command, and/or any keyboard key (e.g., the Windows® key, the Tab key and so on) can be simulated as if physically pressed and released.

By way of example, a gesture that is mapped to a Control key results in (if the system is not already in a Control-key down state) a Control-key down being sent to the window input subsystem 220. While in this mode, further input is thus treated as if the user was holding down the Control key while that further input was entered. Thus, a user can, for example, copy content from a document via a "Ctrl-C" command by marking content, entering a gesture to enter the control mode (which is not sent to the document rendering program and thus leaves the text marked), and entering a "c" in some way.

The gesture management logic 226 of the pen driver 224 also handles exiting the mode at an appropriate time based on further user action. Thus, in the control mode example, the user can exit the control mode in various ways, such as by inputting another Control gesture, pressing and releasing an actual keyboard Control key, or tapping a soft keyboard Control key. Other possible ways include detecting a pen up or a pen down, pressing and releasing the Escape key, actuating a hardware button of the device, and so forth. In the Control key example, exiting the control mode/state is accomplished by having the pen driver 224 send a Control key-up to the window input subsystem 220. Note that the Escape key may be used only to cancel the mode, and thus may not be sent to the underlying application program or shell; however, if so, this precludes using a gesture to enter a modifier key mode to send a Control-Escape, Alt-Escape and so forth to a program. However, in one implementation, the escape key-up event (not the key-down event) is detected in the hook as triggering the exit, whereby sending a Control-Escape, Alt-Escape and so forth to a program is possible.

In one implementation, the key up that is sent matches the key down that was sent or otherwise detected. For example, a user may input a gesture that causes a general-Control down to be sent, and then via a keyboard, cause a left-Control down and left-Control up. A general-Control up will still be sent by the pen driver 224 to the window input subsystem 220 in such a situation. Further, if a user enters a "sticky" mode in some other way, such as one that is entered via a left Alt key down, and then uses a gesture to exit that mode, a matching left Alt key up will be sent by the pen driver 224.

In accordance with another aspect of the present invention, visible feedback may be provided to the user when in a modifier-key mode, generally to help the user recognize that he or she is currently in the modifier-key mode, so as to avoid unexpected behavior, e.g., due to inadvertent entry into a modifier-key mode via a false positive on gesture detection. To this end, in one implementation, the pen driver 224 draws a layered window proximate the mouse pointer, and provides information in that window indicative of the modifier-key mode. Note that the pen driver 224 knows the current mouse pointer coordinates, and can thus draw and redraw the mode-indicator window by the mouse pointer at any desired time, including as the mouse pointer moves, (although for efficiency the redrawing will likely be done at some reasonable maximum rate). Further, because the pen driver also knows the state of keyboard keys, the visible feedback can also be provided when the user uses a keyboard.

The mode-indicator window drawing is represented in FIG. 2 by the pen driver 224 sending pointer mode indicator data to a windowing component 240, which then outputs appropriate information to the display subsystem 242 to draw the window. Note that instead of or in addition to drawing the window proximate the mouse pointer, in alternative implementations the system mouse pointer may be modified, e.g., to change its color, shape, appearance and/or change some other aspect of it to indicate the changed mode.

Figure 4:
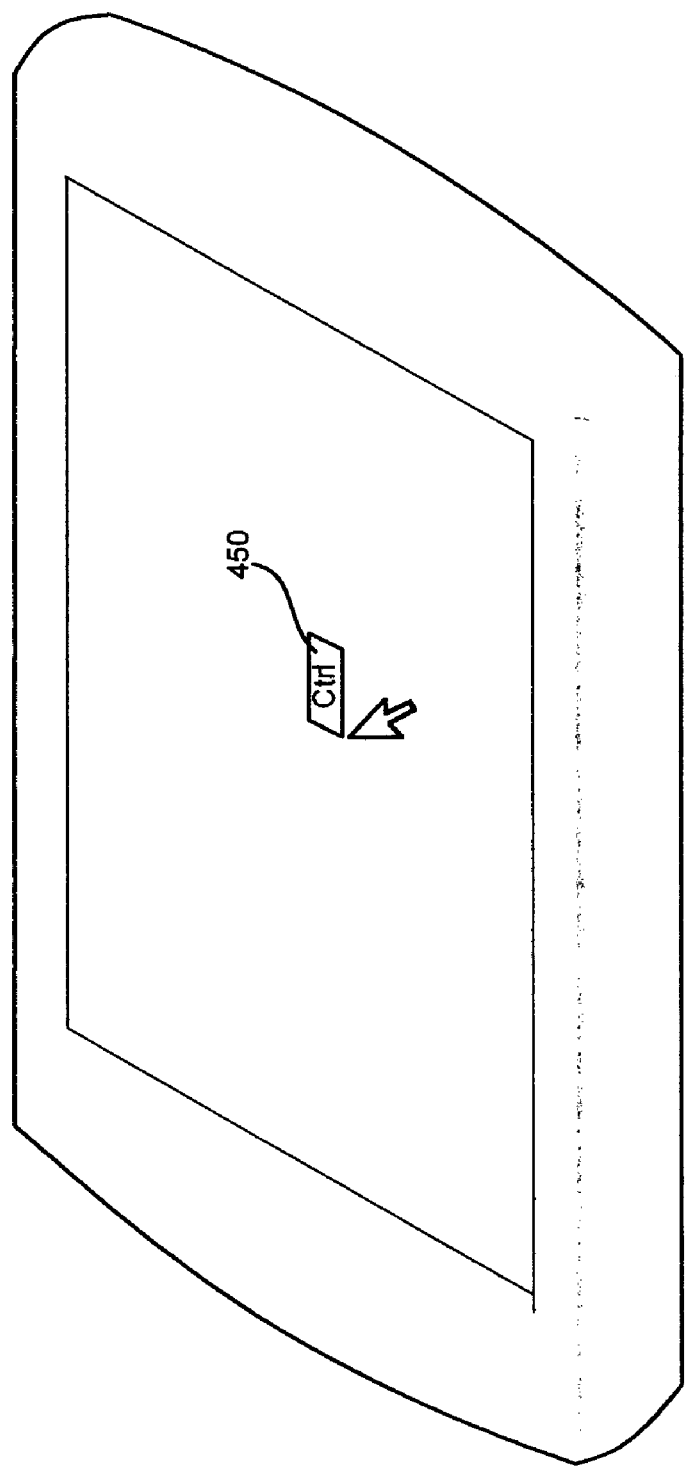
FIGS. 4-6 are representations of a mouse pointer augmented with mode information when in a modifier mode, in accordance with various aspects of the present invention.

FIG. 4 shows one possible way to indicate a modifier key mode, in this example the control mode, where a mode indicator window 450 follows around the mouse pointer and includes text indicative of the current mode. As described above, the pen driver 224 can generate the Control key down that enters the mode, but also monitors the window input subsystem for other Control key down conditions. Thus, the pen driver 224 can draw the mode indicator window at any time the Control key is being held down, or if the user has tapped the Control key on a soft keyboard. Alternatively, the pen driver 224 can limit the drawing of the mode indicator window, e.g., to not draw it when a hardware key is pressed, but draw it at other times including soft keyboard-based or gesture-based activation, or to only draw it when a gesture activated the mode. Any of these alternatives may be user configurable.

Further, as described below, the pen driver 224 may delay drawing the mode indicator window until the mode has been entered for some threshold length of time, e.g., 100 milliseconds, to avoid a flashing effect every time the user simply presses and releases a modifier key, such as when typing normally. The threshold time also may be user configurable.

Figure 5:
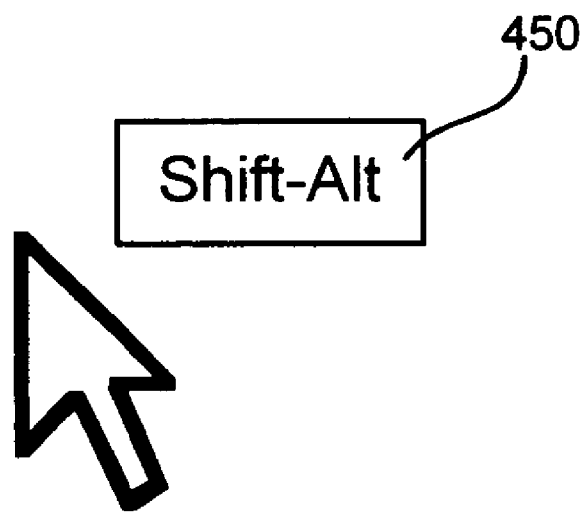

FIG. 5 is an example representation of how the mode indicator window may change (e.g., in text content and/or resize) to indicate a multiple-modifier key mode, i.e., Shift-Alt in the example of FIG. 5. In keeping with the present invention, different modifier key gestures add to one another, e.g., a "Shift-key" gesture followed by an "Alt-key" gesture enters the system into a "Shift-Alt" mode as if the user was holding down both keys. The visual feedback provides an indication of the multiple modifier key state.

Note that in one implementation, one way to exit a modifier key mode is to input a gesture that corresponds to the current mode of the system. For example, inputting a control gesture when already in the control mode will exit the control mode. For multiple mode states, this exiting may be by subtraction, e.g., inputting the control gesture when in the "Control-Alt" mode will change the state to an "Alt" mode, as if the user released only the Control key on a physical keyboard. Alternatively, reentering any corresponding gesture in a multiple mode can exit the mode entirely, e.g., inputting the control gesture when in the "Control-Alt" mode can turn off the multiple mode completely, as if the user released both keys. Again, like any of the alternatives described herein, this may be user configurable.

In yet another implementation, repeating a gesture can lock a mode rather than exit the mode, (although both are feasible if timing is a factor, e.g., to lock a mode a user has to repeat a gesture relatively quickly). Locking can also be accomplished via a "Lock" gesture. The visible indication can change to reflect the locked mode, such as in the example mode indicator 650 represented in FIG. 6.

Figure 6:
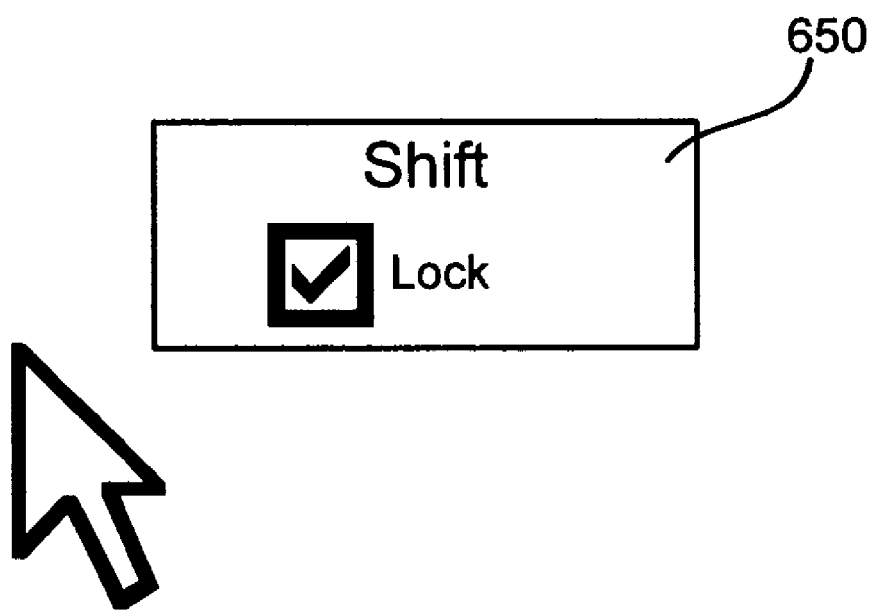

Instead of, or in addition to, locking via a repeated gesture or a Lock gesture, the mode indicator window accompanying the pointer can allow for interaction. Thus, an interactive checkbox or the like as represented in FIG. 6 can be used for indicating the locked state, as well as for toggling the state when tapped or clicked. The mode indicator window can also allow for other types of interaction, e.g., a box to exit the mode. Note however, that the mode indicator window is generally small to avoid obscuring too much visible area beneath it, and thus providing a significant amount of interaction options in the mode indicator window may not be practical. Notwithstanding, the mode indicator window may be transparent to some extent, such as to allow a slightly larger area window yet without obscuring too much information behind it. Also, if the indicator window allows for interaction and moves with the pointer, then a motion delay and/or a motion dead-spot (between the pointer and the interactive element) is needed in order to help the user hit the interactive element.

Figure 7:
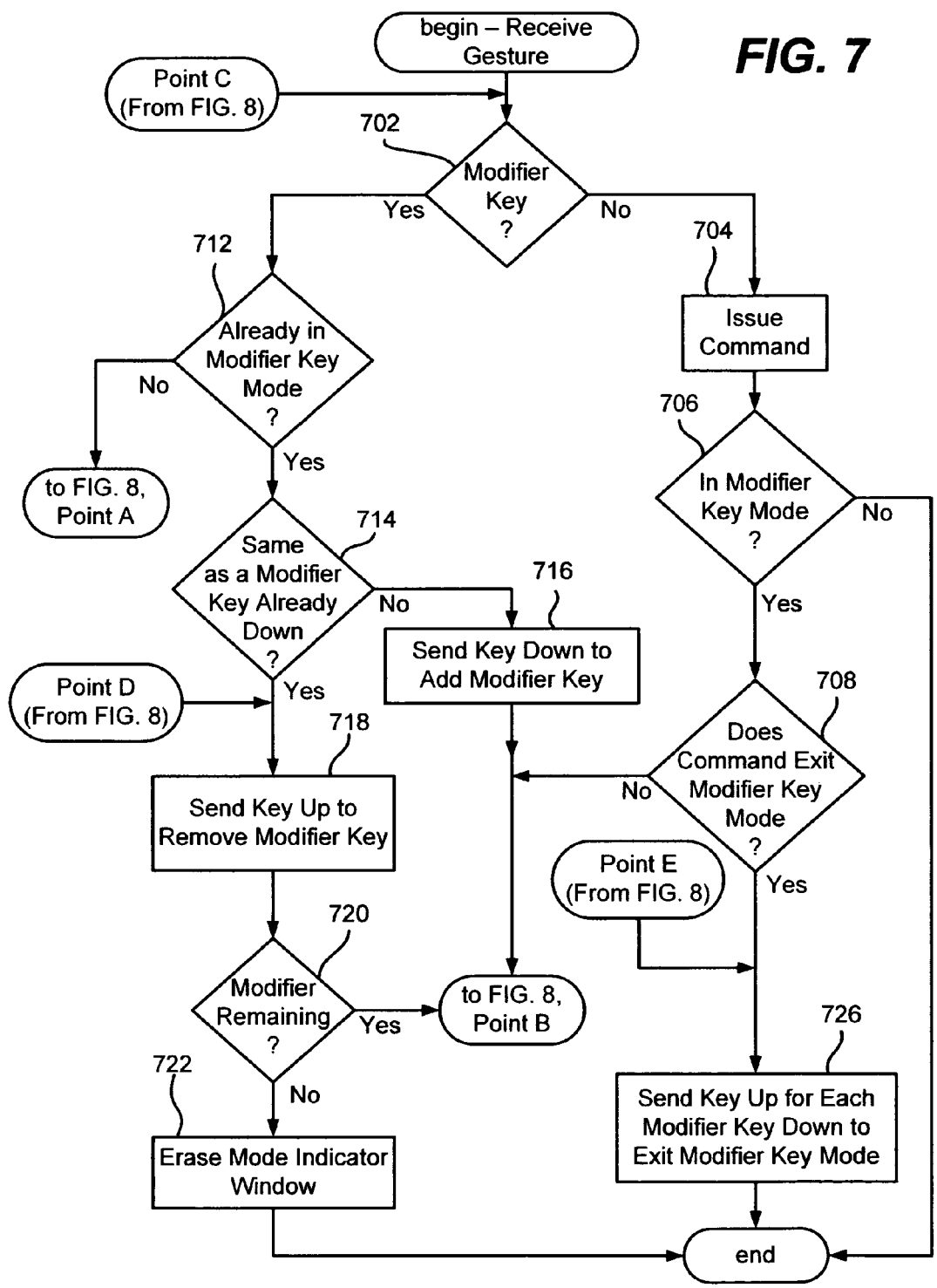
FIGS. 7 and 8 comprise a flow diagram generally representing example steps that may be used for handling gestures, in accordance with various aspects of the present invention.
Figure 8:
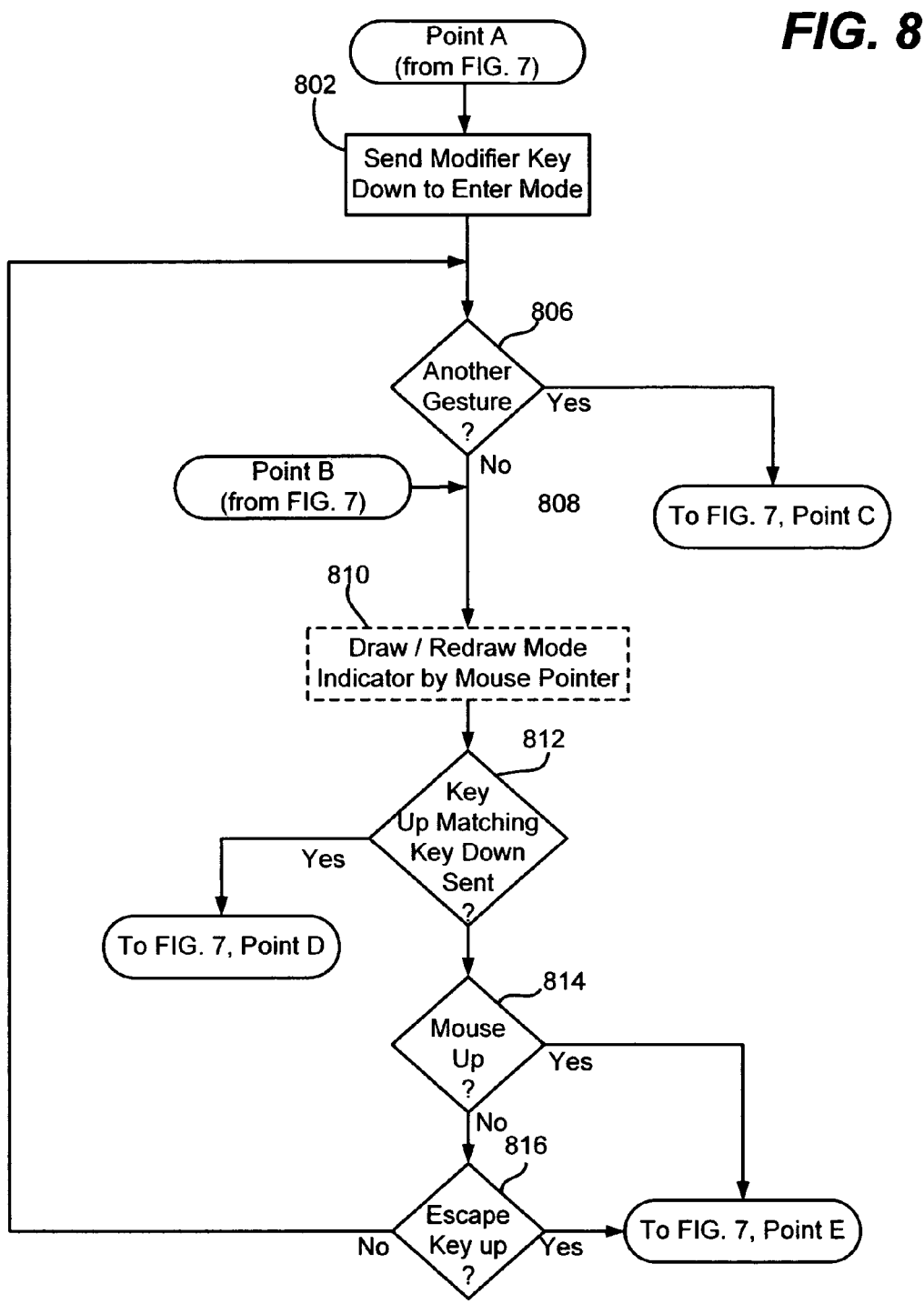

Turning to an explanation of the operation of the present invention with particular reference to FIGS. 7 and 8, the pen driver 224 is essentially always looking for a gesture, e.g., a flick or a spike as described above. Step 702 of FIG. 7 begins when a gesture is first detected and the action to perform has been determined by the pen driver 224. Note that the steps described in FIGS. 7 and 8 are only examples to show some of the decisions and the like that are made to manage the modifier key modes in the event of gestures, mouse events and keyboard events in one example implementation. As can be readily appreciated, various other ways to control modifier key modes are equivalent.

At step 702, the gesture action is evaluated to determine if it corresponds to a modifier key. As described above, some gesture represent other actions, such as a Windows® key or a mouse right-click action. For such actions, a command is issued as represented by step 704, which may be a combination of a key down operation, and up or mouse down and up operation. Step 706 evaluates whether the system is already in a modifier key mode, which, as described below, can happen when another gesture is received while in the gesture handling process of FIGS. 7 and 8. If not, the process ends, because the gesture was handled by the command being issued at step 704. Otherwise, if in a modifier key mode, step 708 is executed to evaluate whether the command exits the mode; e.g., depending on what actions the user is allowed to map a gesture, the gesture may have mapped to an Escape key up and down command action, which would end the mode. If the mode ends, a key up is set for each modifier key that is down, and the gesture handling process of FIGS. 7 and 8 ends, until the next gesture is detected.

Returning to step 702, if the gesture mapped to a modifier key, step 702 instead branches to step 712 to evaluate whether the system is already in a modifier key mode. If so, the process continues to step 714, as described below. Otherwise the process branches to point A of FIG. 8, to enter the modifier key mode.

As represented by step 802 of FIG. 8, the modifier key mode is entered by sending a corresponding key down to the window input subsystem with the appropriate value for that particular modifier key, e.g., the Shift key. The computing device thereafter operates as if the Shift key was being held down on a keyboard, until otherwise canceled in some way as described below.

Step 806 starts a loop that evaluates other gestures, mouse events and keyboard (physical or soft) events that may alter the mode, with step 806 representing waiting for another gesture, and if detected, exiting the loop at least temporarily by returning to point C (step 702) of FIG. 7 to handle the other gesture. Note that a loop is only shown for purposes of explanation, and that some or all of the steps taken in the loop may be event-triggered rather than repeatedly evaluated in a loop.

In any event, within the example loop, step 810 represents optionally (as indicated by the dashed box) drawing and redrawing the mode indicator window 450 near the mouse pointer as described above. In general, and as described below, drawing and redrawing are executed on a separate thread, whereby the initial drawing occurs after some delay so that regular keyboard typing does not cause a flashing effect. However, in an alternative implementation in which only a gesture (and possibly soft key input) changes the cursor appearance, step 810 or the like is executed. Note that the redrawing may include some processing for efficiency purposes so as to only redraw at a practical rate and/or if the pointer has sufficiently moved. Further note that if a soft keyboard is currently being displayed, the soft keyboard display can be changed to reflect the mode as well, e.g., by changing the way the corresponding modifier key (or keys) appear, such as to indicate the key's depression.

Note that because of the pen driver's monitoring of other keyboard and input actions, the mode indicator window can be drawn independent of a gesture. Thus, in one alternative implementation, the mode indicator appears whenever a modifier key is in a held-down state. This drawing and redrawing is performed on a separate thread, which also performs the initial delay (at least for physical keyboard input), so that a user sees mode indicator feedback (after a suitable delay) when holding down a key, for example. Note that the held-down modifier key can have another modifier key added to it via a gesture, as described below with reference to step 716.

Step 812 represents looking for a keyboard key (soft or physical) that has been released and that matches a key down that was sent, e.g., at step 802. For example, if the modifier mode includes a Shift key, step 812 detects a Shift key up. If a match is found, step 812 branches to point D of FIG. 7, described below. Otherwise, steps 814 and 816 look for mouse up or Escape key up events, respectively, which will exit the mode by returning to point E of FIG. 7, as described above with reference to step 726, e.g., by sending one or more corresponding key up modifier keys to exit the modifier key mode. Note that step 814, which can also represent a pen tap down and up, should not be confused with a pen down and up that occurs via another gesture, otherwise a gesture could not add a modifier key to other modifier key, and thus, for example, the mouse/pen up event at step 814 needs to be one that is not part of a gesture. Further, before exiting, the system may wait for a brief time to determine if the mouse is double-clicked/the pen double-tapped, so that, for example, a modified (e.g., control) double-click/tap can be differentiated from a modified single-click/tap.

If implemented, other mode-exiting-related tests (not explicitly shown in FIG. 8 but inherent in the process) may be performed, such as to evaluate whether a hardware button was pressed that causes an exit. If there is no mode exit, the loop is shown returning to step 806; thus, while in the mode, a "sticky" state is achieved in which other user input is modified as if entered while the user was holding down the corresponding key (or key combination).

Returning to step 712, when a modifier key is received when already in the modifier key mode, various actions are possible, e.g., as described above, different modifier keys are additive, so that key combination modes such as Shift-Alt are possible via a gesture for each. If a gesture is received for a key that already has been sent to establish the mode, e.g., a control gesture when already in a Control key down state, as described above it is possible to lock the mode, to exit the mode, or to remove the Control key from the mode. The example of FIGS. 7 and 8 uses a removal-type of behavior, e.g., in which a duplicated gesture removes a key from its held-down state as part of a mode, regardless of the order the key (or gesture) was input, and the mode is exited if no key remains. For example, when in an Alt-Control mode, another Alt gesture will remove the Alt, leaving the system in a control mode; similarly, when in a Shift (only) mode, another Shift gesture will remove the Shift, and also end the mode because no other modifier key was in the down state.

Thus, in the example of FIGS. 7 and 8, step 712 branches to step 714 when already in the mode, and, if a different gesture-generated key has been received as evaluated by step 714, a key down for the key is sent via step 716 to the window input subsystem 220, to essentially add that key so that the mode changes to a modifier key combination. The process then returns to the loop of FIG. 8 to redraw the mode indicator window 450 at step 808, (assuming that the threshold time has been reached, which is likely given that the user has entered at least two gestures to get to this point), and continue until an exit-related action is detected.

If instead at step 714 the user gesture matched an existing key down that was previously sent, step 718 is executed, which represents removing that key via sending a key up. In this "subtraction" model example, if there is at least one modifier key remaining, the process continues to point B of FIG. 8 to redraw the mode indicator window 450 at step 808 and resume the loop, looking for further user input relevant to exiting or modifying the mode. If at step 720 no modifier remains in a key down state, step 722 represents erasing the mode indicator window 450 before exiting the process. Note that in a model in which any one duplicated gesture ended the process (as opposed to the subtraction model described above), the "Yes" branch of step 714 could directly go to step 722.

As can be seen, the gesture handling process of FIGS. 7 and 8 allows a user to enter a "sticky-key" mode for anything designated as a modifier key, and, in essence, to accomplish a modifier key mode. Thus, for example, the user may flick one direction to enter a Shift, whereby the next place tapped will be a Shift-tap, (or a Shift-click, or a shifted character, and so on). Once in a mode, the system also monitors system-wide mouse and keyboard input using low level hooks, so as to remain in the key down state (and possibly add to it or subtract from it) until an exit-related action is detected, e.g., a duplicate gesture is detected, a key-up of the modifier key is received, the escape key is released, or a mouse click up is detected.

It can be readily appreciated that gestures can also enter the computing device into sticky-type modes that are not necessarily keyboard-related modes. For example, a user can input a gesture to enter a mode in which the user can write anywhere on the screen to have text recognized, instead of being required to write in a specified area such as an application program window. A gesture can be used to switch a display mode from landscape to portrait, or vice versa. Gestures also can be used to change touch-sensitive behavior, e.g., turning on or off a targeting ring that assists the user in selecting a particular item on the display. Numerous other types of mode changes are feasible.

As can be seen from the foregoing detailed description, there is provided a method and system that uses gestures to provide mode changes, including modifier-key based modes. The gestures allow keyboard-like behavior, including at times when a keyboard is not readily available. Other computer operating modes may be similarly changed by gestures.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device, a computer-implemented method comprising:
    detecting a first gesture indicative of a first modifier key function, the first gesture being inputted by a pointing device;
    sending modifier key down data corresponding to the first modifier key function to an input subsystem that is configured to receive keyboard input; and
    in response, changing an operating mode of the computing device such that the first modifier key function is applied to input received subsequent to the first gesture.

2. The method of claim 1 further comprising, detecting an action that indicates the changed operating mode should be exited, and in response to the action, sending key up data corresponding to the first modifier key function to the input subsystem such that the first modifier key function is not applied to subsequent input.

3. The method of claim 1 further comprising:
    detecting a second gesture indicative of a second modifier key function, the second gesture being inputted by a pointing device, and in response, sending modifier key down data corresponding to the second modifier key function to the input subsystem; and
    changing the operating mode of the computing device such that the first modifier key function and the second modifier key function are applied to input received subsequent to the second gesture.

4. The method of claim 1 further comprising:
detecting an event corresponding to the first modifier key function, and in response, sending modifier key up data corresponding to the first modifier key function to the input subsystem such that the first modifier key function is not applied to subsequent input.

5. The method of claim 4 wherein the event results from at least one operation of a set of operations, the set including, detecting another gesture, detecting a pen down event, detecting a pen-up event, detecting a physical keyboard event, and detecting a soft keyboard event.

6. The method of claim 1 further comprising, outputting a visible indication representative of the operating mode change.

7. The method of claim 6 further comprising, delaying prior to outputting the visible indication.

8. The method of claim 6 wherein outputting the visible indication includes outputting data that identifies the first modifier key function.

9. The method of claim 6 wherein outputting the visible indication comprises, detecting the position of a mouse pointer, and positioning the visible indication based on the position of the mouse pointer such that the visible indication appears to move with the mouse pointer.

10. The method of claim 6 further comprising, detecting user interaction with the visible indication, and changing a state of the operating mode based on the interaction.

11. A computer storage medium having stored computer-executable instructions, which when executed perform steps, comprising:
detecting a first gesture indicative of a first modifier key function, the first gesture being inputted by a pointing device;
sending modifier key down data corresponding to the first modifier key function to an input subsystem that is configured to receive keyboard input; and
in response, changing an operating mode of the computing device such that the first modifier key function is applied to input received subsequent to the first gesture.

12. A computer storage medium of claim 11 having further computer-executable instructions, comprising:
outputting a visible indication representative of the modifier key down data having been sent; and
detecting an action that indicates that modifier key up data corresponding to the first modifier key function should be sent to the input subsystem, and in response, sending key up data corresponding to the first modifier key function to the input subsystem such that the first modifier key function is not applied to subsequent input.

13. The computer storage medium of claim 12 having further computer-executable instructions, comprising, delaying prior to outputting the visible indication.

14. The computer storage medium of claim 12 having further computer-executable instructions, comprising, detecting the position of a mouse pointer, and wherein outputting the visible indication comprises positioning the visible indication based on the position of the mouse pointer such that the visible indication appears to move with the mouse pointer.

15. The computer storage medium of claim 11 having further computer-executable instructions, comprising:
detecting a second gesture indicative of a second modifier key function, the second gesture being inputted by a pointing device, and in response, sending modifier key down data corresponding to the second modifier key function to the input subsystem; and
changing the operating mode of the computing device such that the first modifier key function and the second modifier key function are applied to input received subsequent to the second gesture.

16. In a computing device having a program, a system comprising:
a processor in communication with an input subsystem that processes keyboard and mouse input; and
a memory in communication with the processor and storing executable instruction which when executed by the processor implement a method for providing data to the input subsystem to change an operating mode of the computing device upon detection of a gesture corresponding to a modifier key function, the method comprising:
detecting a first gesture indicative of a first modifier key function, the first gesture being inputted by a pointing device;
sending modifier key down data corresponding to the first modifier key function to the input subsystem; and
in response, changing an operating mode of the computing device such that the first modifier key function is applied to input received subsequent to the first gesture.

17. The system of claim 16 wherein the memory further stores instructions for outputting a visible indication representative of the modifier key down data having been sent.

18. The system of claim 17 wherein outputting the visible indication is delayed for a threshold time after sending the modifier key down data.

19. The system of claim 16 wherein the modifier key function comprises one of the following: a Control modifier key function, an Alt modifier key function, a Shift modifier key function, a Windows® modifier key function, and an AltGr modifier key function.

* * * * *